Sept. 24, 1963 — W. F. BUCHELE — 3,104,725
POWERED SOIL SAMPLER
Filed March 28, 1960 — 2 Sheets-Sheet 1

INVENTOR
WESLEY F. BUCHELE
ATTORNEY

Sept. 24, 1963 W. F. BUCHELE 3,104,725
POWERED SOIL SAMPLER
Filed March 28, 1960 2 Sheets-Sheet 2

INVENTOR
WESLEY F. BUCHELE

BY R. Hoffman
ATTORNEY 3,104,725
POWERED SOIL SAMPLER
Wesley F. Buchele, % Department of Agricultural Engineering, College of Agriculture, Michigan State University, East Lansing, Mich.
Filed Mar. 28, 1960, Ser. No. 18,296
3 Claims. (Cl. 175—244)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a powered soil sampler. More particularly it relates to a portable device for use in the field whereby an undisturbed soil core may be obtained and removed from the site for study or other purposes.

One phase in the study of soils for the purpose of improving farming or conservation practices involves the taking of samples of soil at various depths below the surface.

To this end, a number of sampling devices are commercially available. However, all of these have one or more disadvantages in that they take too-short samples, they must be driven into the soil by hammering, or coring tube rotates thereby disturbing the sample so that an accurate profile cannot be obtained.

One object of the present invention is to provide a thin-walled sampler capable of taking an undisturbed soil core. Another object is to provide such a sampler by means of which the core may be obtained in a form capable of being cut into short lengths for separate study of soil at different depths. Still another object is to provide a portable power driven sampler capable of being operated by means of a small portable source of power. Other objects and advantages will be apparent to those skilled in the art from the following description.

In general, the soil sampler of this invention comprises a means for cutting an annular ring of soil and for recovering undisturbed the column of soil from the center of the annular ring.

More particularly, the soil sampler comprises a non-rotating, hollow, resiliently mounted, thin-walled cylindrical coring tube which is driven into the soil in an axial direction by a rotating opened center auger coaxially disposed outside the coring tube. The auger is driven through a reduction gear train by means of any suitable power attachment, such as, an electric drill or a portable gasoline engine, which is attached to a power-input shaft on one end of the gear train. Because the coring tube itself does not rotate, no twist or other force is applied to the soil core and the latter is thereby recovered undisturbed. In this manner reliable data is obtained as to bulk density, porosity, root distribution, location of nutrients, and other qualities which must be measured to obtain complete information regarding the soil under study.

In order that the invention may be fully understood the sampler will be described in detail below, with reference being made to the accompanying drawings in which.

Figures 1, 4, 5:
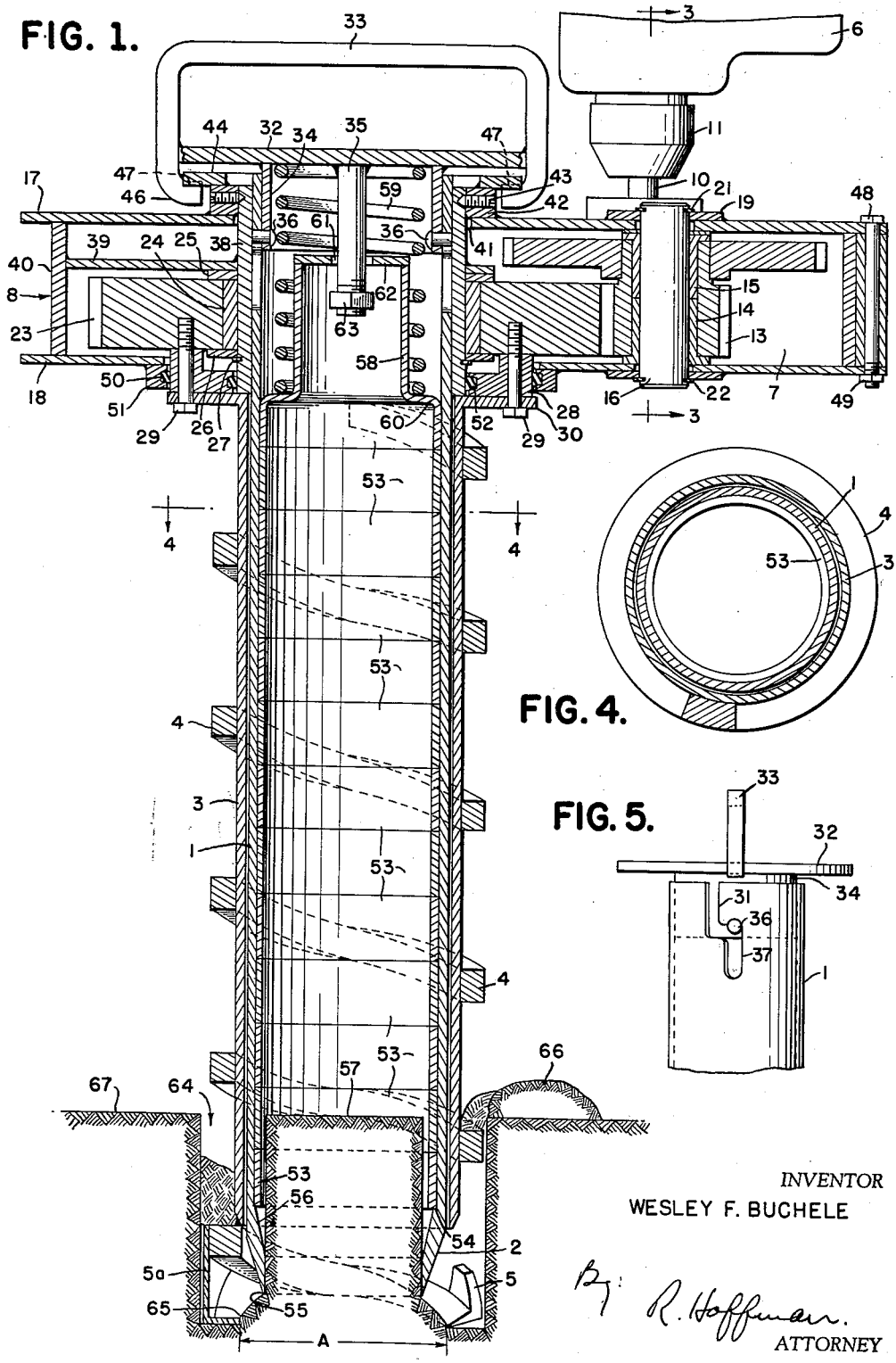
FIGURE 1 shows a vertical section of the completely assembled apparatus in the process of taking a soil sample.
FIGURE 4 is a section taken on line 4—4 of FIGURE 1 showing the concentric arrangement of the several cylindrical elements.
FIGURE 5 shows the upper end of the coring tube and the means by which it is inserted into and removed from the apparatus.

More particularly, the device comprises an elongated cylindrical coring tube 1 having a tapered cutting edge 2. Coring tube 1 is surrounded by a second cylindrical tube 3, coaxial therewith. An opened end auger 4, having cutting bits 5 and 5a is welded to or in any other suitable manner secured to the outside of tube 3, hereinafter referred to as the "auger tube." The inside diameter of auger tube 3 is somewhat greater than the outside diameter of coring tube 1, thus permitting the auger tube to rotate freely about the coring tube which itself remains non-rotating during operation of the device.

The auger tube is driven by means of any suitable power source 6, such as, an electric drill through a reduction gear train designated generally as 7 in FIGURE 1 contained in housing 8. This gear train comprises a small driving gear 9 mounted to rotate with input shaft 10 which in turn is coupled to the source of power 6 by means of chuck 11. Gear 9 meshes with gear 12 which is secured on gear 13 in any suitable manner. Gear 13 is mounted by means of bushings 14 and 15 to rotate freely about shaft 16 which is secured to upper and lower covers 17 and 18 of housing 8 by means of washers 19 and 20 and spring washers 21 and 22. Thus, gears 12 and 13 rotate together, the latter driving gear 23. Gear 23 is mounted to rotate about bushing 24 and is prevented from moving axially by means of flat washers 25 and 26 and spring washer 27. A ring 28, concentric with gear 13 is secured to the latter by means of bolts 29 which also pass through holes provided in flange 30 of auger tube 3. In this manner, auger tube 3 is secured to gear 23 and rotates therewith.

Coring tube 1 is mounted in housing 7 in such a manner as to be non-rotating. To accomplish this, and to provide for insertion into and removal from the apparatus, the upper end of coring tube 1 is provided with a plurality of slots 31 (FIGURE 5). Two slots, 180° apart, or three slots, 120° apart, are satisfactory.

A disc-like member 32 is secured, as by welding, to the inside of an inverted C-shaped handle 33. To the under side of disc 32, and coaxial therewith, there are welded a short cylindrical member 34 and a short threaded pin 35. A plurality of pins 36, corresponding in number to the number of slots 31 in coring tube 1, are driven radially through holes in the lower end of cylinder 34. Pins 36 are sufficiently long to protrude beyond the walls of cylinder 34. The outside diameter of the latter is somewhat smaller than the inside diameter of the coring tube, permitting easy insertion. Pins 36 engage slots 31. To secure the handle to the coring tube it is merely necessary to twist one or the other to have the pins engage the offset portion 37 of the slot 31. In this manner, the coring tube may be removed from or inserted into the device. As will be apparent from FIGURE 5, the engagement of pin 36 and slot 37 will permit a limited relative axial movement, but no rotation.

To mount the coring tube for use, a cylindrical member 38, having an internal diameter sufficiently large to admit the coring tube, is rigidly secured in housing 8 by any suitable means, as by welding to plate 39 which in turn is welded to side wall 40 of the housing. Cylindrical member 38 fits through a hole 41 in cover plate 17 and extends as far as flange 30 of the auger tube. To further secure cylindrical member 38, a ring 42 is welded to cover plate 17 and a plurality of set screws 43 are employed to hold the cylindrical member to ring 42. A second ring 44, of larger diameter than ring 42 is welded to the latter to form a flange. Ring 44 is provided with a pair of slots 45, diametrically opposed, to receive the bent-in ends 46 of the C-shaped handle 33. Grooves 47, machined in the under surface of ring serve as guides for ends 46 of the handle. The coring tube assembly, carried by handle 33, is inserted into the apparatus and secured therein by passing handle ends 46 through slots 45 and twisting the handle slightly so that ends 46 engage the under surface of ring 44.

It will be understood that cover plate 17, ring 42, and ring 44 may be fabricated as a single piece.

Figure 3:
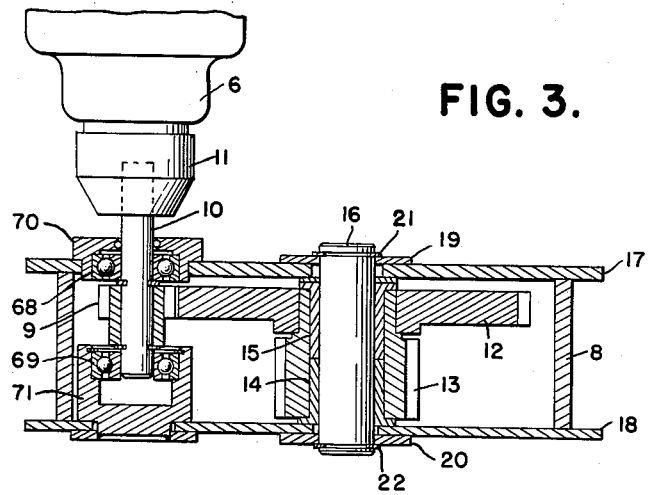
FIGURE 3 is a section taken on line 3—3 of FIGURE 1 showing the means for coupling the power source to the gear train.
Figure 2:
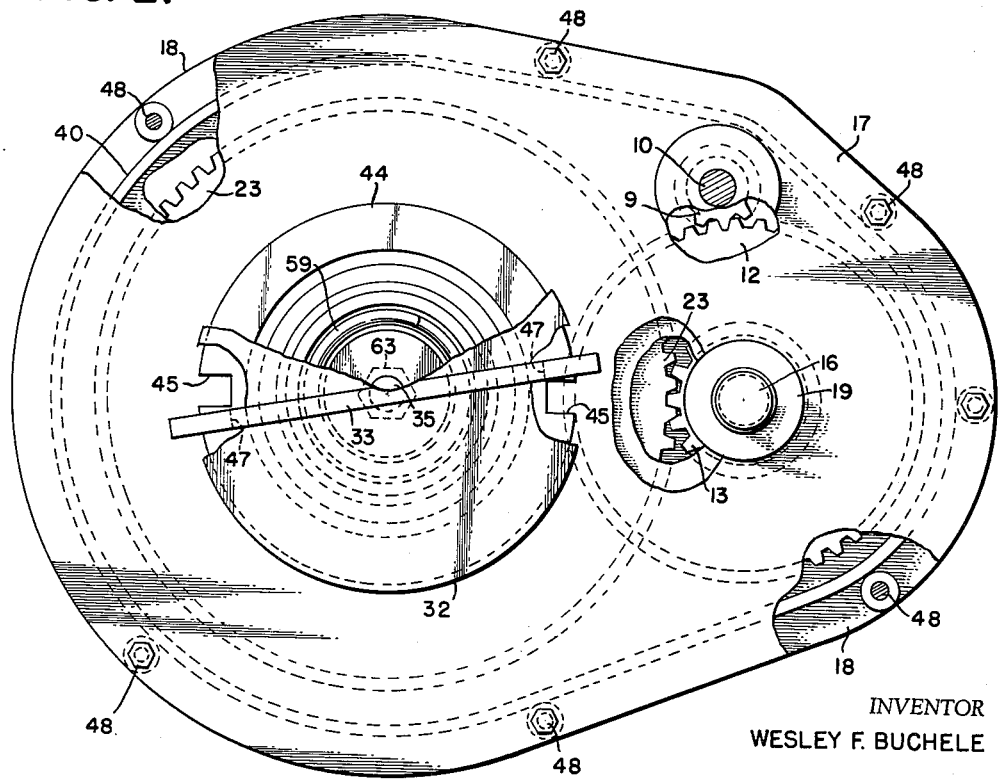
FIGURE 2 is a plan view of the apparatus.

Further details of the housing assembly and its contents include a plurality of bolts 48 and nuts 49 to secure top and bottom plates 17 and 18, respectively, and any conventional method for mounting power input shaft 10, one such method being illustrated in FIGURE 3. Thus, shaft 10 is mounted to rotate in ball bearings 68 and 69 which in turn are mounted in bearing blocks 70 and 71, respectively. The usual fittings for lubricating the internal moving parts (not shown) may be provided. To seal in lubricants and to keep out dirt a sealing ring 50, mounted in ring 51, is so placed as to bear on rotating ring 28. A second sealing ring 52 is mounted in ring 28 to bear on cylindrical member 38. Ring 51 is welded to bottom plate 18; although it will be obvious that plate 18 and ring 51 may be fabricated as one piece.

One novel feature of the present invention resides in the provision of a plurality of annular liners 53 which fit inside coring tube 1. The bottom liner 53 rests on shoulder 54 near the lower end of the coring tube.

Coring tube 1 has a cutting edge 2 which is sharpened toward the center, and a cut back conical section 56 of greater diameter than the internal diameter of cutting edge 2. The inside diameter of liners 53 is slightly larger than the inside diameter of cutting edge 2, thereby offering no resistance to soil core 57 and thus in no way disturbing the latter.

The liners 53 are held in place by liner holder 58 which also functions as a guide for loading spring 59. This spring is compressed between shoulder 60 of spring guide and liner holder 58 and the under surface of disc 32. Threaded pin 35 passes through hole 61 in plate 62 which is secured at the top of member 58. A nut 63, or any other suitable stop means, is screwed onto the end of pin 35 thereby preventing member 58 from falling off.

When completely assembled, but before operation of the device begins, spring 59 is fully extended, causing plate 62 to bear against nut 63. Coring tube 1 is of such length that its cutting edge 2 protrudes a short distance, about ⅜ inch, beyond the extremity of cutting bits 5 and 5a of auger 4.

To operate the soil sampler, it is placed on the surface of the soil 67 over the spot from which a sample is desired. Tube 1 enters the soil until cutting bits 5 and 5a rest upon the ground. If the ground is hard the tube retracts with respect to the auger, compressing spring 59.

Cutting bits 5 and 5a are sharpened to shed soil, stones, and roots. Rotating the auger causes its bits to cut into the soil and produce an annular ring or hole 64 and a column of soil 65 whose outside diameter, indicated by "A" in FIGURE 1, is greater than the inside diameter of the cutting edge 55 of soil tube 1. As the resistance to cutting becomes greater tube 1 retracts until its cutting edge is higher than the cutting bits. This is illustrated in FIGURE 1, and is the normal operating position. Edge 2 trims the soil column 65 to an exact size as it follows the bits 5 and 5a into the soil, thus producing the core 57. In the particular device described, the length of the coring tube is so selected that, in the operating position, resistance to cutting causes the edge of the tube to lag about ⅜ inch behind the cutting bits. The diameter of the cutting edge of the coring tube is about ½ inch smaller than the column produced by the cutting bits, thus trimming approximately ¼ inch of soil from the outer diameter of the soil column, thus reducing the diameter of the soil column approximately ½ inch. This amount is sheared off with a minimum of effort, leaving the column of soil and its surface undisturbed.

Since the auger bits are aggressive they cut their way into the soil and pull the sampler with them. In this way, no disturbing pressure is applied to the soil other than the slight amount needed to trim the ½ inch from the column.

The soil trimmed from the column falls sideways into the ring cut by the auger. The auger elevates the soil cut from the annular ring 64 and that trimmed by the coring tube from the column of soil 65, and deposits it on the surface as a pile 66.

Since the inside diameter of cutting edge 2 (the outside diameter of core 57) is smaller than the inside diameter of liners 53, it will be apparent that there will be no contact between core 57 and the inner surface of liners 53 and the core thus stands free of the liners. In this manner, plus the fact that coring tube 1 and its contained liners do not rotate, no undue stresses are applied to core 57 with the result that the latter may be recovered undistrubed to give a true profile over its entire length.

After the auger has reached its maximum or desired depth the handle is given a slight twist to break the core loose from its base, the apparatus is lifted from the hole, and the coring tube is removed by means of handle 33. The handle itself is then removed from the top of tube and the core, together with liners 53, is removed from the top by pushing its lower end. The core and liners may be deposited in any suitable receptacle, such as, a trough conforming to the shape of the core (not shown), and sliced into sections having the thickness of a liner. In this manner it is possible to make individual studies on the nature of the soil at various depths without disturbing the remainder of the sample.

I claim:

1. A soil sampling device for obtaining an undisturbed soil sample comprising a stationary housing; power-transmitting means within said housing; external power-input and power-output means connected to said power-transmitting means; an elongated auger rotatably connected to said power-output means; cutting means attached to a soil-engaging end of said auger for cutting an annular ring into the soil and for producing a central column of soil; a cylindrical member for encasing said column of soil having a diameter smaller than that of the auger and of the column of soil; a soil cutting edge at one end of said cylindrical member for trimming said column of soil, said soil cutting edge having an internal diameter smaller than that of said cylindrical member; and means for non-rotatably but resiliently mounting said cylindrical member in the housing, said cylindrical member being coaxial and extending beyond said auger.

2. A soil sampling device for obtaining an undisturbed soil sample comprising a stationary housing; power-transmitting means within said housing; external power-input and power-output means connected to said power-transmitting means; an elongated auger rotatably connected to said power-output means; cutting means attached to a soil-engaging end of said auger adapted to cut an annular ring into the soil and to produce a central column of soil; a cylindrical coring tube having an external diameter smaller than that of the auger; means for non-rotatably but resiliently and removably mounting said cylindrical coring tube for axial movement in the housing; a cutting edge on said coring tube at the soil engaging end thereof having an internal diameter smaller than that of the column of soil for trimming said column; a plurality of annular liners removably mounted within the coring tube for encasing the trimmed column of soil, said coring tube being located coaxially to the auger and extending beyond said auger.

3. A soil sampling device for obtaining an undisturbed soil sample comprising a stationary housing having upper and lower cover means, said housing being provided with a cylindrical passageway extending through said cover means; power transmitting means within said housing; external power-input and power-output means connected to said power-transmitting means; an elongated auger rotatably connected to said power-output means; cutting means attached to a soil engaging end of said auger adapted to cut an annular ring into the soil and to produce a central column of soil; an elongated cylindrical coring tube having an external diameter smaller than that of auger and of the cylindrical passageway in the housing extending into said passageway from one end thereof, said coring tube being provided at the end which extends into said passageway with a first axial slot, a second axial slot offset from said first axial slot, and a connecting circumferential slot to provide access from said first to said second axial slot; external holding means extending into said passageway from the other end thereof; means on said external holding means for engaging said second axial slot to hold the end of the coring tube inside the passageway to prevent rotary but to permit limited axial movement of said coring tube; means on the upper cover means of the housing for engaging and removably securing the external holding means to the housing; a plurality of annular liners removably mounted within the coring tube; internal holding means within the cylindrical passageway for holding the annular liners within the coring tube; and resilient means engaging both said internal and external holding means; said coring tube being provided at its soil engaging end with a cutting edge whose inside diameter is smaller than that of the central column of soil and smaller than the inside diameter of said annular liners for trimming said column of soil to a diameter small enough to permit passage of said column of soil into said annular liners, said coring tube being located coaxially to the auger and extending beyond said auger.

References Cited in the file of this patent
UNITED STATES PATENTS

| | | |
|---|---|---|
| 997,358 | Ameling | July 11, 1911 |
| 1,456,983 | Hansen | May 29, 1923 |
| 2,230,808 | Mohr | Feb. 4, 1941 |
| 2,260,678 | Muhlbach | Oct. 28, 1941 |
| 2,403,002 | Johnson | July 2, 1946 |
| 2,532,716 | Havlick | Dec. 5, 1950 |
| 2,862,691 | Cochran | Dec. 2, 1958 |
| 2,876,996 | Hildebrandt | Mar. 10, 1959 |